US012425837B2

(12) United States Patent
Jin et al.

(10) Patent No.: US 12,425,837 B2
(45) Date of Patent: *Sep. 23, 2025

(54) DIRECT ESIM TRANSFER BETWEEN WIRELESS DEVICES

(71) Applicant: Apple Inc., Cupertino, CA (US)

(72) Inventors: Sherman X Jin, Santa Clara, CA (US); Rafael L Rivera-Barreto, Santa Clara, CA (US); Rohan C. Malthankar, San Jose, CA (US); Clive E. Rodgers, Palo Alto, CA (US); Raj S. Chaugule, Santa Clara, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 420 days.

This patent is subject to a terminal disclaimer.

(21) Appl. No.: 17/932,669

(22) Filed: Sep. 15, 2022

(65) Prior Publication Data

US 2023/0079902 A1    Mar. 16, 2023

Related U.S. Application Data

(60) Provisional application No. 63/261,296, filed on Sep. 16, 2021.

(51) Int. Cl.
*H04W 8/18* (2009.01)
*H04W 8/20* (2009.01)
*H04W 60/04* (2009.01)

(52) U.S. Cl.
CPC ........... *H04W 8/205* (2013.01); *H04W 8/183* (2013.01); *H04W 8/20* (2013.01); *H04W 60/04* (2013.01)

(58) Field of Classification Search
CPC ....... H04W 8/205; H04W 8/20; H04W 8/183; H04W 60/04
See application file for complete search history.

(56) References Cited

U.S. PATENT DOCUMENTS

| 11,871,227 | B2 | 1/2024 | Lee | |
|---|---|---|---|---|
| 12,022,571 | B2 | 6/2024 | Yoon | |
| 2016/0241537 | A1 | 8/2016 | Cha | |
| 2018/0352425 | A1 | 12/2018 | Vasudevan | |
| 2019/0075453 | A1* | 3/2019 | Yoon | H04W 12/06 |
| 2020/0137566 | A1* | 4/2020 | Jin | H04W 12/43 |
| 2021/0076204 | A1 | 3/2021 | Goyal | |
| 2022/0167146 | A1* | 5/2022 | Khanduri | H04W 4/50 |

(Continued)

OTHER PUBLICATIONS

U.S. Appl. No. 17/932,668, Notice of Allowance dated Oct. 30, 2024.

*Primary Examiner* — Jinsong Hu
*Assistant Examiner* — Farideh Madani
(74) *Attorney, Agent, or Firm* — DICKINSON WRIGHT RLLP

(57) ABSTRACT

The described embodiments set forth techniques for transferring an electronic subscriber identity module (eSIM) with the same integrated circuit card identifier (ICCID) value from a source mobile wireless device to a target mobile wireless device directly with a mobile network operator (MNO) provisioning server. The target mobile wireless device downloads the eSIM from the MNO provisioning server after deletion of the eSIM on the source mobile wireless device and reassignment of the eSIM with the same ICCID value to the target mobile wireless device.

20 Claims, 13 Drawing Sheets

(56) References Cited

U.S. PATENT DOCUMENTS

2022/0174495 A1 6/2022 Lee
2023/0081421 A1 3/2023 Jin et al.
2023/0209340 A1 6/2023 Kang

* cited by examiner

DIRECT ESIM TRANSFER BETWEEN WIRELESS DEVICES

CROSS-REFERENCE TO RELATED APPLICATIONS

The present application claims the benefit of U.S. Provisional Application No. 63/261,296, entitled "DIRECT eSIM TRANSFER BETWEEN WIRELESS DEVICES," filed Sep. 16, 2021, the content of which is incorporated by reference herein in its entirety for all purposes.

This application is related to U.S. patent application Ser. No. TBD, entitled "DIRECT eSIM TRANSFER BETWEEN WIRELESS DEVICES," (P55034US1), filed concurrently herewith, the contents of all of which are incorporated by reference herein in their entirety for all purposes.

FIELD

The described embodiments set forth techniques for transferring an electronic subscriber identity module (eSIM) with the same integrated circuit card identifier (ICCID) value from a source mobile wireless device to a target mobile wireless device directly with a mobile network operator (MNO) provisioning server. The target mobile wireless device downloads the eSIM from the MNO provisioning server after deletion of the eSIM on the source mobile wireless device and reassignment of the eSIM with the same ICCID value to the target mobile wireless device.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as a subscriber identity module (SIM). Typically, a UICC takes the form of a small removable card, commonly referred to as a SIM card or physical SIM (pSIM) card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Transfer of a UICC between mobile wireless devices allows a user to re-use a SIM profile on different mobile wireless devices. An eSIM, however, is stored on a non-removable eUICC. Present methods to transfer of a cellular wireless service subscription associated with an eSIM between mobile wireless devices can require a newly assigned integrated circuit card identifier (ICCID) value for a new eSIM on the receiving mobile wireless device, which can incur extra time and cost for cellular wireless service provisioning and account management. There exists a need for methods to transfer an eSIM between mobile wireless devices while reusing the same ICCID value for the new eSIM.

SUMMARY

This Application sets forth techniques for transferring an electronic subscriber identity module (eSIM), provisioned with a unique associated integrated circuit card identifier (ICCID) value, from a source mobile wireless device to a target mobile wireless device, reusing the same ICCID value for the eSIM when provisioned and installed on the target mobile wireless device. The eSIM transfer can be through secure, encrypted connections between the source mobile wireless device and the target wireless device, directly or indirectly, and between each of the source and target mobile wireless devices and a mobile network operator (MNO) provisioning server. Transfer of the eSIM occurs without change to the ICCID value or requiring billing account updates. In some embodiments, transfer can be triggered by a user that maintains a device manufacturer managed account associated with both the source mobile wireless device and the target mobile wireless device and requiring multi-factor authentication. Transfer can be further secured by requiring each of the source and target mobile wireless devices to have personal identification number (PIN) codes for unlocking the devices enabled. In some embodiments, subscription information for the eSIM on the source mobile wireless device is uploaded to a user account maintained in a cloud network service of the original equipment manufacturer (OEM) of the source mobile wireless device. The eSIM subscription information can be later retrieved by an authorized user of the user account to the target mobile wireless device. The target mobile wireless device can request transfer of the eSIM from the source mobile wireless device, which can send a direct transfer request to the MNO provisioning server, the direct transfer request including a unique eUICC identifier (EID) value for the eUICC of the target mobile wireless device to which to transfer the eSIM, the corresponding EID value of the eUICC of the source mobile wireless device from which to transfer the eSIM, and the unique ICCID value of the eSIM to transfer. The MNO provisioning server, after acceptance of the transfer request, notifies the source mobile wireless device to delete the eSIM. After the MNO provisioning server receives notification that the eSIM is deleted, the MNO provisioning server reassigns the ICCID value of the eSIM to the EID value of the eUICC of the target mobile wireless and acknowledges the re-assignment to the source mobile wireless device. The source mobile wireless device provides eSIM transfer information to the target mobile wireless device, which downloads and installs the eSIM from the MNO provisioning server. After notification to the MNO provisioning server of successful eSIM installation, the target mobile wireless device camps on the MNO cellular wireless access network using credentials from the eSIM. The MNO provisioning server, in some embodiments, can subsequently push an over-the-air (OTA) update to the target mobile wireless device. In some embodiments, when one or both of the source and target mobile wireless devices do not maintain a user account with the OEM cloud network service, secure communication of information for transfer of the eSIM can be accomplished using dynamic quick response codes presented by a display of one device and scanned by the other device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
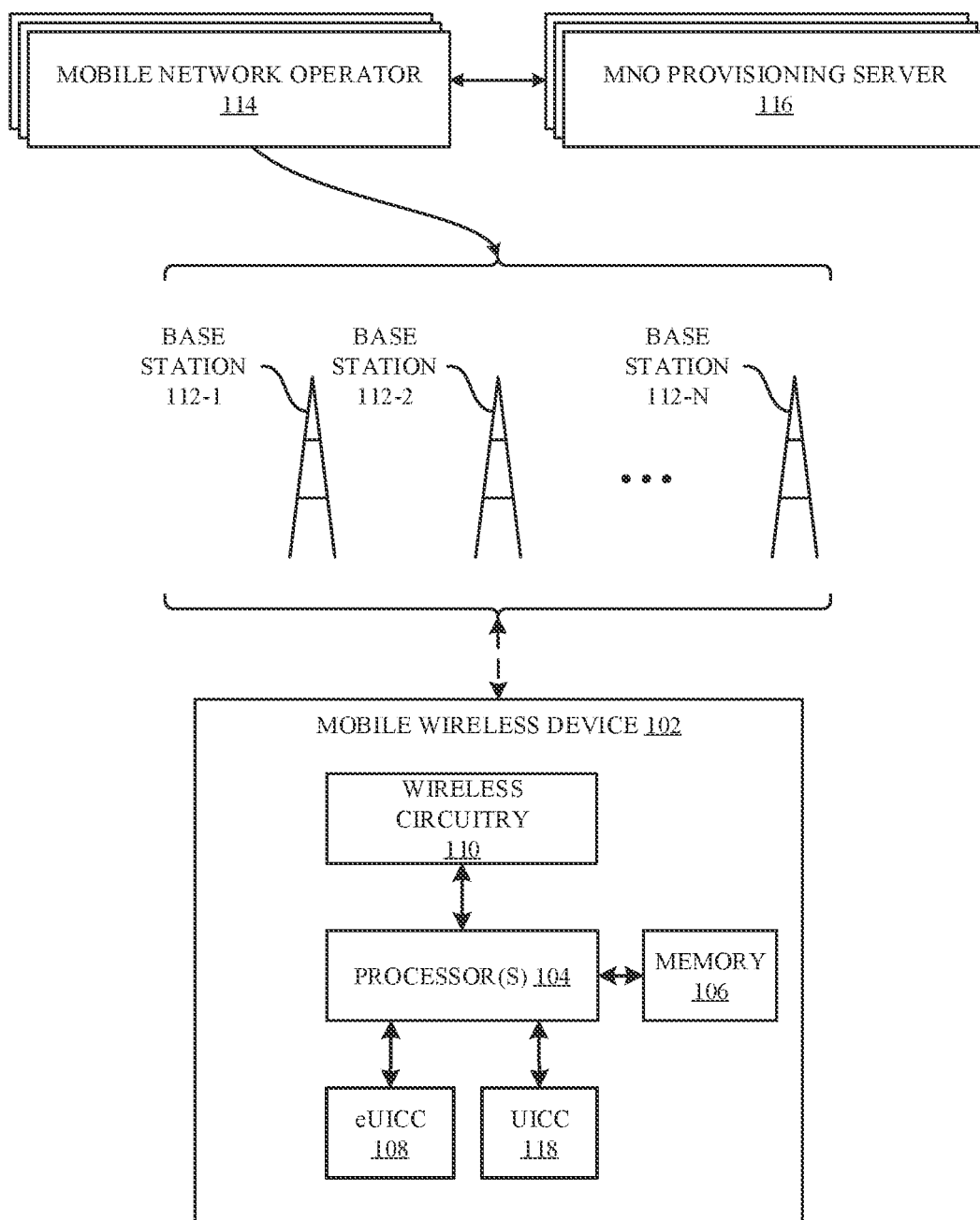
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for transferring an electronic subscriber identity module (eSIM), provisioned with a unique associated integrated circuit card identifier (ICCID) value, from a source mobile wireless device to a target mobile wireless device, reusing the same ICCID value for the eSIM when provisioned and installed on and embedded universal integrated circuit card (eUICC) of the target mobile wireless device as was previously used when the eSIM was installed on the eUICC of the source mobile wireless device. As eSIMs can be installed on non-removable eUICCs, an eSIM cannot be transferred in the same manner as a physical SIM (pSIM) card that can be removed from one device and inserted into another device. Instead, an eSIM is removed from a source mobile wireless device after authorization for re-assignment by an MNO provisioning server and subsequently downloaded to and installed on an eUICC of the target mobile wireless device. As the same ICCID value for the eSIM is re-used and a subscription associated with the eSIM also transfers to the target mobile wireless device, back-end billing and account system changes are reduced.

The eSIM transfer can be accomplished with the use of secure, encrypted communication between the source mobile wireless device and the target wireless device, directly or indirectly, and between each of the source and target mobile wireless devices and a mobile network operator (MNO) provisioning server. Exemplary connections include non-cellular connections via a wireless personal area network (WPAN), e.g., using a Bluetooth protocol, or via a peer-to-peer wireless local area network (WLAN) as well as cellular connections via a cellular wireless network. Communication of information can be via secure, encrypted store and forward (or retrieval) by a cloud network service. In some embodiments, transfer can be triggered by a user that maintains a device manufacturer managed account associated with both the source mobile wireless device and the target mobile wireless device, where access to the account and/or to the devices requires multi-factor authentication. In some embodiments, the devices also requires a personal identification number (PIN) code to effect transfer of the eSIM. Transfer can be further secured by requiring each of the source and target mobile wireless devices to have personal identification number (PIN) codes for unlocking the devices enabled. In some embodiments, the devices also require entry of a personal identification number (PIN) code to effect transfer of the eSIM. In some embodiments, subscription information for the eSIM on the source mobile wireless device is uploaded to a user account maintained in a cloud network service of the original equipment manufacturer (OEM) of the source mobile wireless device. The eSIM subscription information can be later retrieved by an authorized user of the user account to the target mobile wireless device. In some embodiments, the target mobile wireless device obtains, e.g., from a cloud network service, a list of transferable phone numbers associated with eSIMs of one or more source mobile wireless devices associated with a common user account of the cloud network service. Access to the list can occur as part of an initial device configuration process or by accessing cellular service settings via an operating system query. A user can select an eSIM for transfer from the source mobile wireless device to the target mobile wireless device. User consent to the transfer can be obtained via the source mobile wireless device from which the eSIM is to be transferred.

The target mobile wireless device can request transfer of the eSIM from the source mobile wireless device. In some embodiments, the transfer request includes device transfer information regarding the target mobile wireless device for transfer of the eSIM. In some embodiments, the source mobile wireless device obtains device transfer information from the target mobile wireless device. The source mobile wireless device subsequently sends a direct transfer request to an MNO provisioning server associated with the eSIM to be transferred. The direct transfer request can include a unique eUICC identifier (EID) value for the eUICC of the target mobile wireless device to which to transfer the eSIM, the corresponding EID value of the eUICC of the source mobile wireless device from which to transfer the eSIM, and the unique ICCID value of the eSIM to transfer. In some embodiments, the direct transfer request includes a proprietary application programming interface (API) command, such as an "iccidTransferRequest" command.

The MNO provisioning server, after acceptance of the transfer request, notifies the source mobile wireless device to delete the eSIM. The source mobile wireless device subsequently performs an eSIM deletion procedure for the eSIM having the ICCID value specified previously in the transfer request, and after successful deletion of the eSIM, the source mobile wireless device sends a notification (e.g., an ES9+ handleNotification) to the MNO provisioning server indicating the eSIM deletion completion. In some embodiments, when the eSIM being deleted from the source mobile wireless device is the only activated cellular wireless access credentials available, the source mobile wireless device can establish a separate connection to communicate with the MNO provisioning server after deletion of the eSIM. In some embodiments, the separate connection is via a non-cellular wireless access, such as via a WLAN network. In some embodiments, the separate connection is via a fallback, limited functionality bootstrap SIM pre-installed in the source mobile wireless device, e.g., at a time of manufacture.

After the MNO provisioning server receives notification that the eSIM is deleted from the source mobile wireless device, the MNO provisioning server reassigns the ICCID value of the eSIM to the EID value of the eUICC of the target mobile wireless and releases the eSIM for downloading to and installation on the target mobile wireless device. The MNO provisioning server sends an acknowledgement to the source mobile wireless device indicating successful re-assignment of the eSIM to the target mobile wireless device. The source mobile wireless device subsequently provides eSIM transfer information to the target mobile wireless device, e.g., a network address such as a universal resource locator (URL) or fully qualified domain name (FQDN) for the MNO provisioning server from which the eSIM is available for download to the target mobile wireless device. In some embodiments, the eSIM transfer information includes a network address for a device manufacturer device services server 358 from which the target mobile wireless device can obtain a network address for the MNO provisioning server. In some embodiments, the eSIM transfer information includes a MatchingID associated with assignment and/or download/installation of the eSIM to the target mobile wireless device. Using the eSIM transfer information, at least in part, the target mobile wireless device downloads and installs the eSIM from the MNO provisioning server.

Upon successful downloading and installation of the eSIM, the target mobile wireless device sends to the MNO provisioning server a notification message indicating successful eSIM installation. In some embodiments, the notification message includes an ES2+ handleNotification. After notifying the MNO provisioning server of successful eSIM installation, the target mobile wireless device camps on the MNO cellular wireless access network using credentials from the eSIM. The MNO provisioning server, in some embodiments, can subsequently push an over-the-air (OTA) update to the target mobile wireless device. In some embodiments, when one or both of the source and target mobile wireless devices do not maintain a user account with the OEM cloud network service, secure communication of information for transfer of the eSIM can be accomplished using dynamic quick response codes presented by a display of one device and scanned by the other device.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
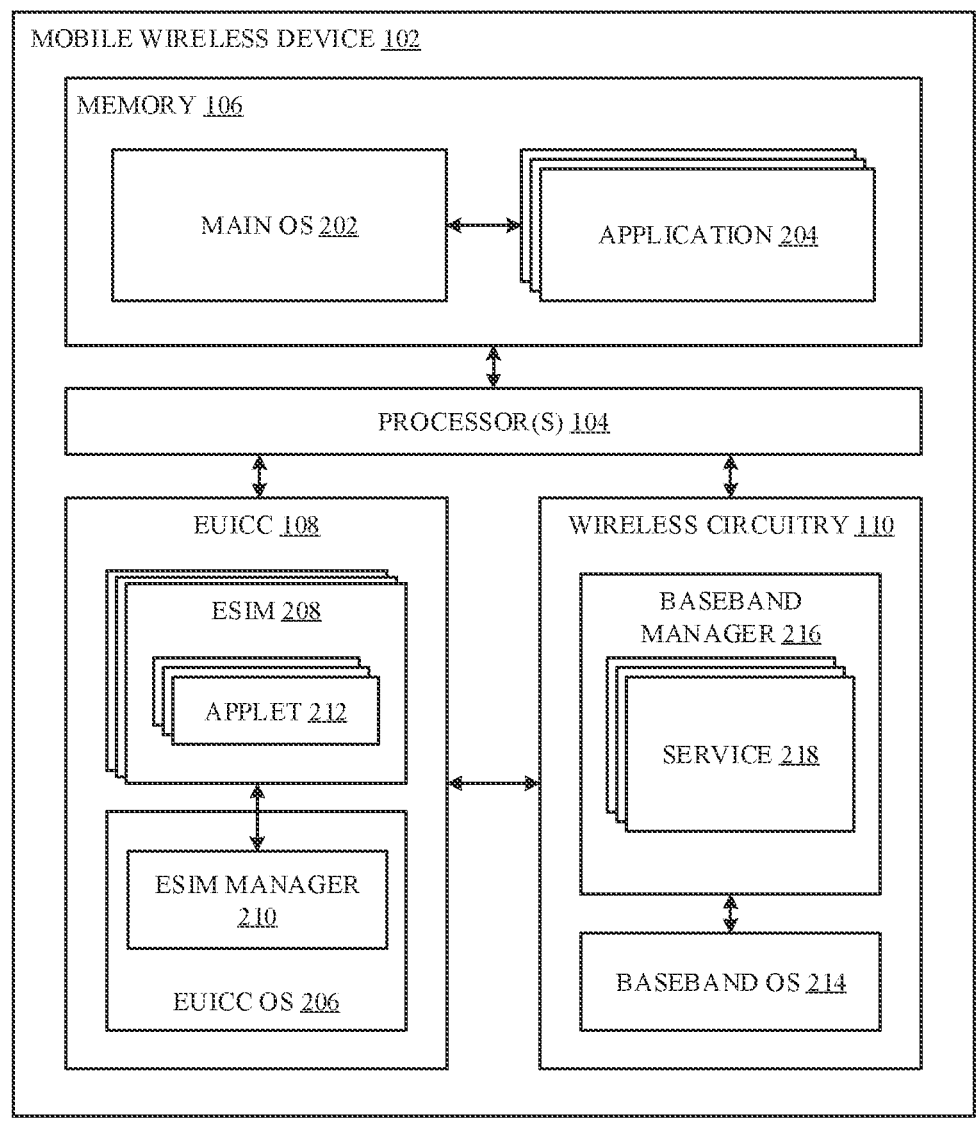
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
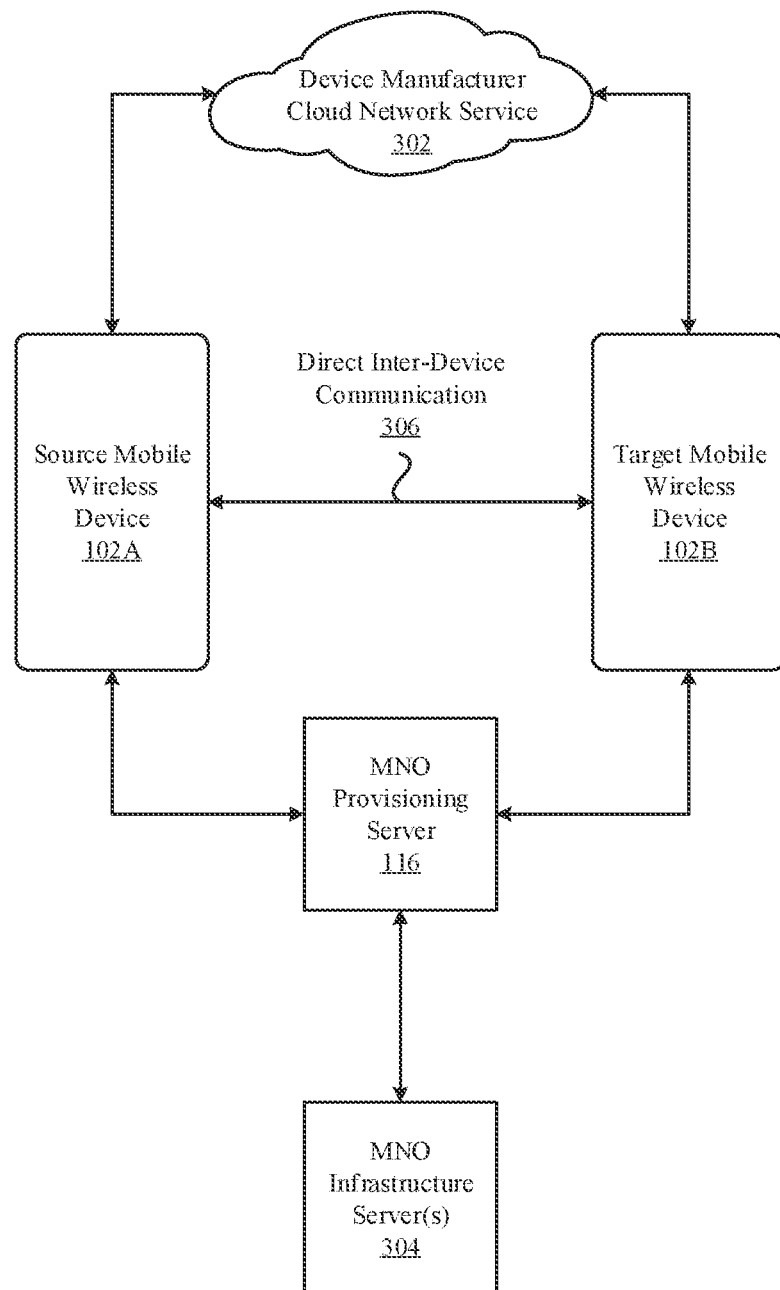
FIG. 3A illustrates a block diagram of exemplary communication paths and network entities for transfer of an eSIM from a source mobile wireless device to a target mobile wireless device, according to some embodiments.

FIG. 3A illustrates a diagram 300 of an exemplary interconnected set of components of a communication system that can be used to transfer an eSIM 208 from a source mobile wireless device 102A to a target mobile wireless device 102B. The source and target mobile wireless devices 102A, 102B can establish a direct inter-device communication path 306, e.g., using one or more various wireless technologies, such as near field communication (NFC), Bluetooth, peer-to-peer wireless local area network, and/or Wi-Fi. The source and target mobile wireless devices 102A, 102B can also communicate indirectly via a device manufacturer cloud network service 302. In some embodiments, each of the source and target mobile wireless devices 102A, 102B are associated with a common user account maintained by the device manufacturer cloud network service 302. In some embodiments, the source mobile wireless device 102A uploads device information to store securely at the device manufacturer cloud network service 302. Exemplary device information can include cellular service subscription information for each eSIM installed on the source mobile wireless device, such as a phone number, also referred to as a mobile station integrated services digital network (MSIDN) value, a unique eSIM 208 identifier, also referred to as an integrated circuit card identifier (ICCID) value, an eUICC identifier (EID) value, and an MNO provisioning server 116 address associated with the eSIM 208. In some embodiments, the target mobile wireless device 102B can obtain the cellular service subscription information from the device manufacturer cloud network service 302 to present to a user of the target mobile wireless device 102B for transfer selection of an eSIM 208 from the source mobile wireless device 102A to the target mobile wireless device 102B. The source and target mobile wireless devices 102A, 102B can communicate via cellular wireless access and/or non-cellular wireless access (not shown) with the MNO provisioning server 116, e.g., to download eSIMs 208 and updates to installed eSIMs 208. Direct transfer of an eSIM 208 can be accomplished via communication between the source and target mobile wireless devices 102A, 102B and with the MNO provisioning server 116 directly, with the MNO provisioning server 116 determining whether to approve transfer and communicating with MNO infrastructure servers 304 as required to complete transferal of the eSIM 208. Representative MNO infrastructure servers 304 include back-end servers that manage subscriber accounts and billing services.

Figure 3B:
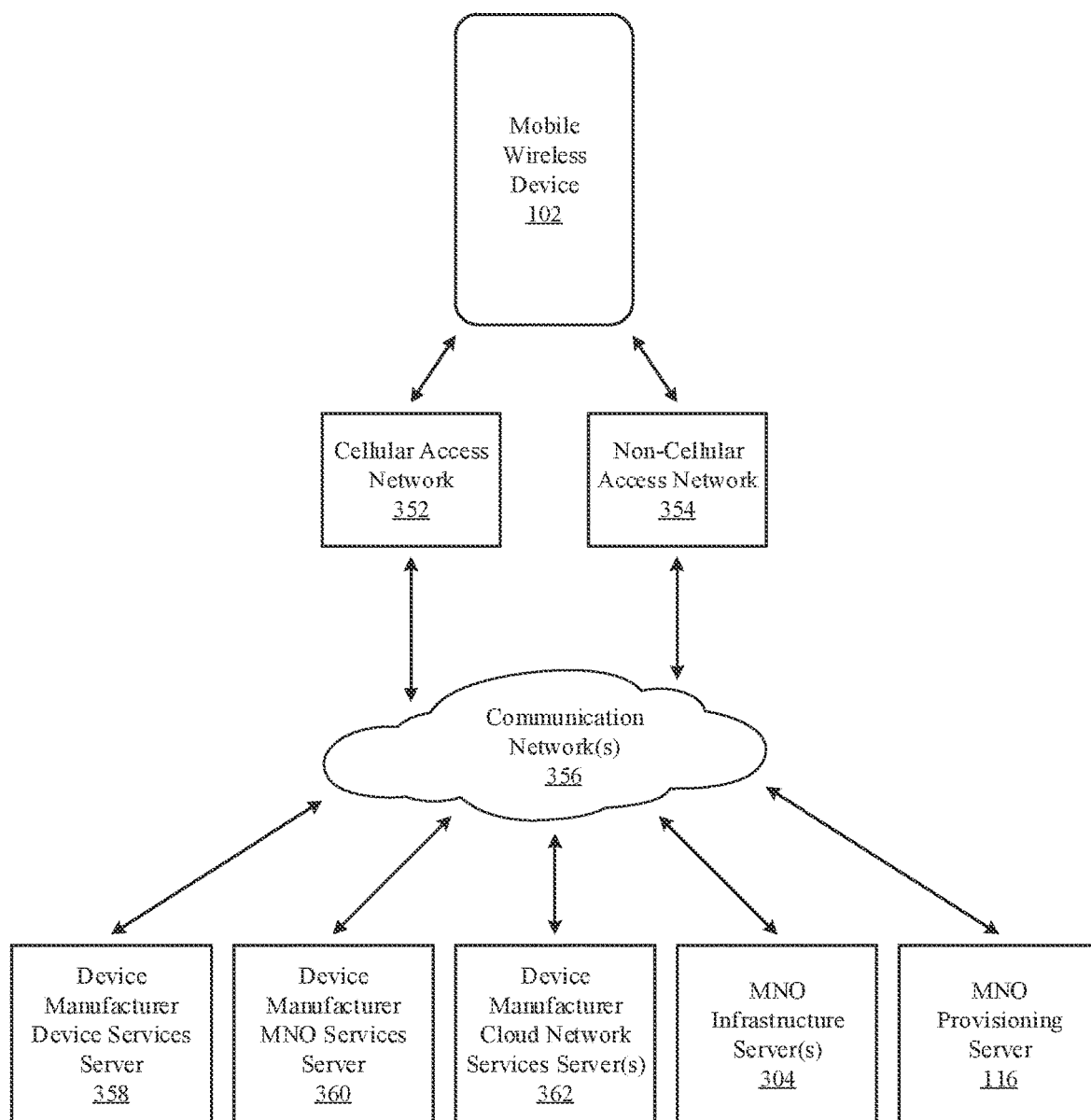
FIG. 3B illustrates a block diagram of exemplary communication between a mobile wireless device and network entities for transfer of an eSIM, according to some embodiments.

FIG. 3B illustrates a diagram 350 of an exemplary interconnected set of components of a communication system that can be used for device activation and SIM provisioning for a mobile wireless device 102. The mobile wireless device can communicate with various network-based servers via a cellular access network 352 and/or via a non-cellular access network 354 when available. The cellular and/or non-cellular access networks 352, 354 can provide access via communication networks 356 to various network-based servers managed by a device manufacturer or an MNO 114. In some embodiments, the mobile wireless device 102 communicates via a cellular access network 352 when a non-cellular access network 354 is not available. In some embodiments, the mobile wireless device 102 communicates via the cellular access network 352 using a limited functionality SIM (as a physical SIM on a UICC 118 or as an eSIM 208 on an eUICC 108) pre-installed in the mobile wireless device 102 at a time of manufacture when no other active SIM is available on the mobile wireless device 102. An OEM manufacturer of the mobile wireless device 102 can maintain multiple network-based servers to assist with management of the mobile wireless device 102, e.g., a device manufacturer device services server 358, which can provide management for device manufacturer supplied services to the mobile wireless device 102, and a device manufacturer managed MNO services server 360, which can provide a device manufacturer anchor for management of MNO supplied services to the mobile wireless device 102. The OEM manufacturer can also maintain device manufacturer cloud network services servers 362 to provide a cloud network service for storage of device information and data. In some scenarios, multiple mobile wireless devices 102 can be associated with a common user account of a device manufacturer cloud network service 302 realized at least in part by device manufacturer cloud network services servers 362. The multiple associated mobile wireless devices 102 can communicate information between them using the cloud network service. An MNO 114 can also provide their own set of servers, including various MNO infrastructure servers 304 for managing cellular access, authentication, authorization, subscription, billing, and other associated management functions for cellular wireless services for the mobile wireless device 102, and MNO provisioning servers 116 from which SIM firmware, e.g., eSIMs 208, OTA updates for eSIMs 208 or pSIMs, etc., can be accessed, with appropriate authentication, by the mobile wireless device 102.

Figure 4A:
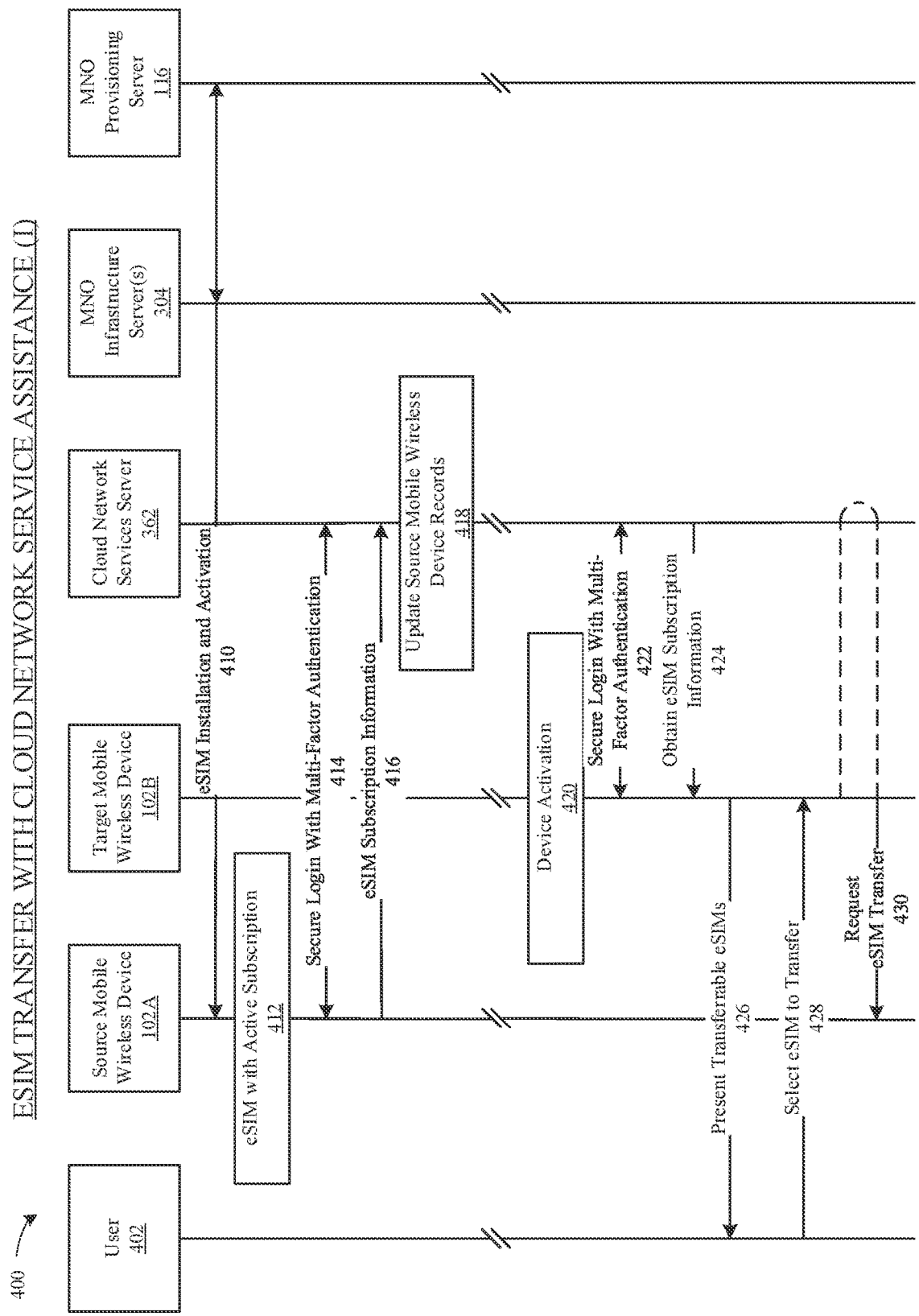
FIGS. 4A, 4B, and 4C illustrate an exemplary eSIM transfer between mobile wireless devices with cloud network service assistance, according to some embodiments.
Figure 4B:
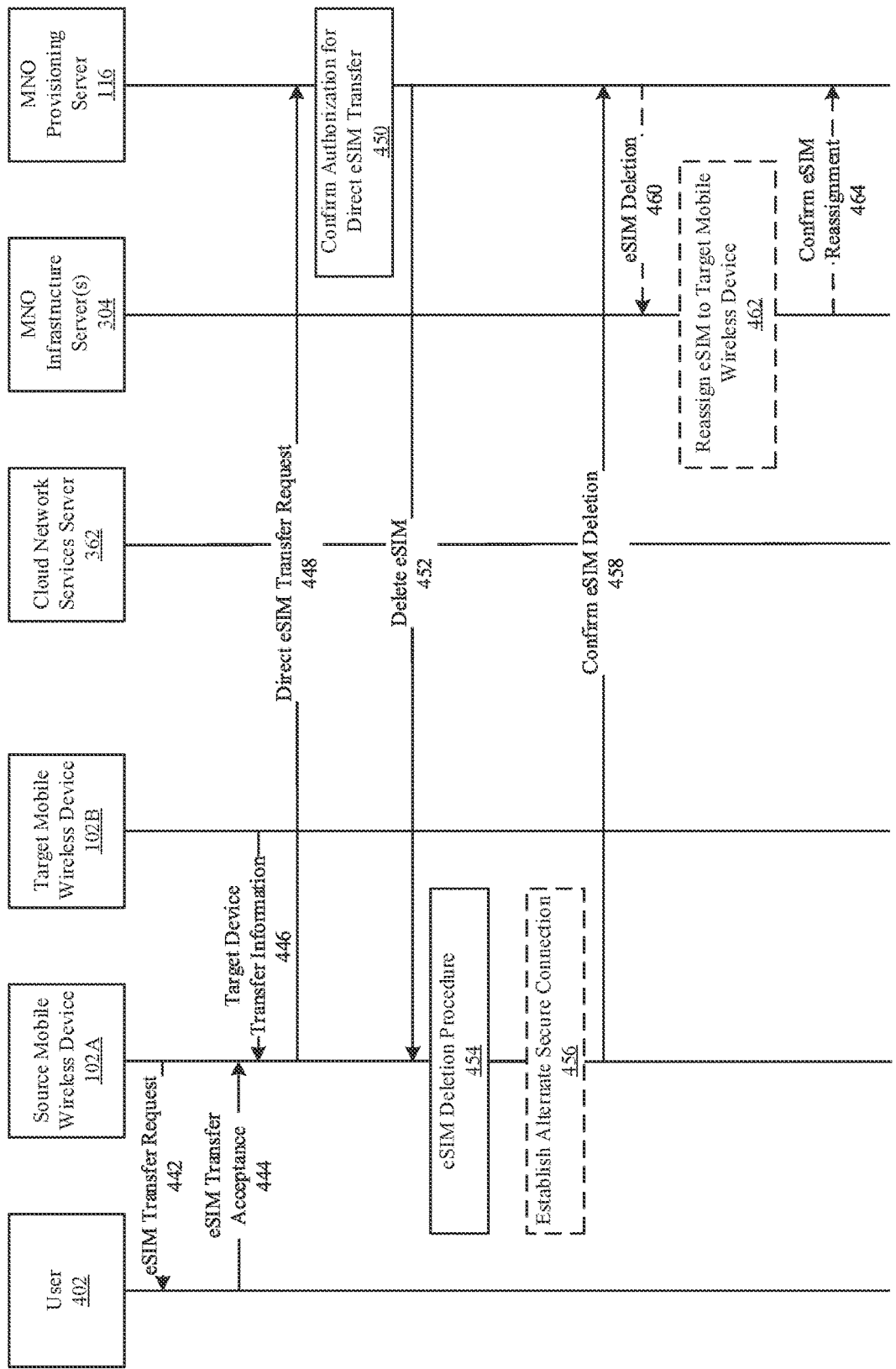
Figure 4C:
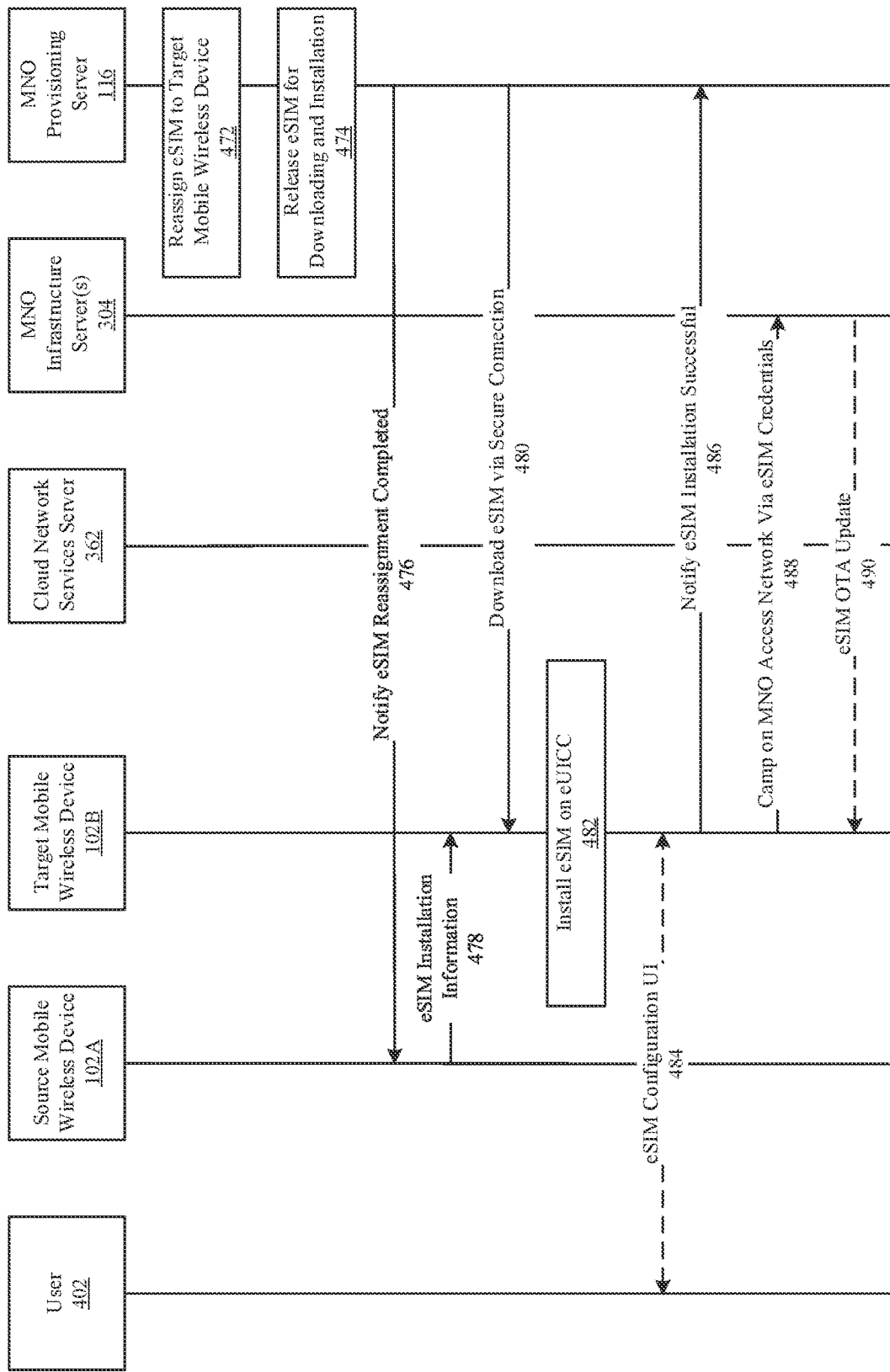

FIGS. 4A, 4B, and 4C illustrate diagrams 400, 440, 470 of an exemplary flow of messages and actions to transfer an eSIM 208 from a source mobile wireless device 102A to a target mobile wireless device 102B with assistance from a device manufacturer cloud network service 302 to facilitate the transfer. At 410, the source mobile wireless device 102A downloads, installs, and activates an eSIM 208 from an MNO provisioning server 116, which can communicate with MNO infrastructure servers 304 to activate and manage wireless service subscription associated with the eSIM 208 for the source mobile wireless device 102A. The eSIM 208 can be associated with a cellular service subscription account and can include credentials to provide access to cellular wireless services offered by an MNO 114. At 412, the source mobile wireless device 102A can have completed installation and activation of the eSIM 208 on an eUICC 108 of the source mobile wireless device 102A. At 414, the source mobile wireless device 102A can securely login to a cloud network services server 362 of a device manufacturer cloud network service 302 with multi-factor authentication enabled. At 416, the source mobile wireless device 102A can upload to the cloud network services server 362 eSIM subscription information associated with the eSIM 208. In some embodiments, the eSIM subscription information includes a mobile station integrated services digital network (MSIDN) value, a unique eSIM 208 identifier, also referred to as an integrated circuit card identifier (ICCID) value, an eUICC identifier (EID) value, and an address, e.g., a URL or FQDN, for the MNO provisioning server 116 associated with the eSIM 208. At 418, the device manufacturer cloud network services server 362 can update device records for cellular service subscriptions associated with the source mobile wireless device 102A. In some embodiments, the cloud network services server 362 can maintain separate records for each eSIM 208 installed on the eUICC 108 of the source mobile wireless device 102A.

At a subsequent time 420, a user 402 of the source mobile wireless device 102A can acquire and perform a device activation process for a target mobile wireless device 102B. The user 402 can associate the target mobile wireless device 102B with a common user account of the device manufacturer cloud network service 302 as associated with the source mobile wireless device 102A. The user 402 of the source and target mobile wireless devices 102A, 102B can seek to transfer an eSIM 208 from the eUICC 108 of the source mobile wireless device 102A to the target mobile wireless device 102B. At 422, the target mobile wireless device 102B can securely login with multi-factor authentication to the cloud network services server 362 and obtain, at 424 from the device manufacturer cloud network services server 362, eSIM subscription information 424 for the source mobile wireless device 102A. At 426, the target mobile wireless device 102B can present to the user 402, e.g., via a display of the target mobile wireless device 102B, a list of eSIMs 208 that are transferrable from the source mobile wireless device 102A to the target mobile wireless device 102B, and at 428, the user 402 can select an eSIM 208 to transfer. At 430, the target mobile wireless device 102B, responsive to the eSIM 208 selection, can send a message to the source mobile wireless device 102A requesting transfer of the eSIM 208 from the source mobile wireless device 102A to the target mobile wireless device 102B. In some embodiments, the target mobile wireless device 102B communicates the transfer request directly to the source mobile wireless device 102A, e.g., via direct inter-device communication path 306, which can be securely encrypted in some scenarios. In some embodiments, the target mobile wireless device 102B communicates the transfer request indirectly to the source mobile wireless device 102A, e.g., via the cloud network services server 362. At 442, the source mobile wireless device 102A presents a notification of the eSIM transfer request to the user 402, who at 444 provides acceptance of the eSIM transfer request. At 446, after acceptance of the eSIM transfer, the source mobile wireless device 102A obtains from the target mobile wireless device 102B target device transfer information 446, which can include an EID value for the eUICC 108 of the target mobile wireless device 102B to which the eSIM 208 is to be transferred.

At 448, the source mobile wireless device 102A sends a message to the MNO provisioning server 116 to request direct transfer of the eSIM 208 from the source mobile wireless device 102A to the target mobile wireless device 102B. In some embodiments, the message is an ES9+ TransferRequest message. In some embodiments, the message is a device manufacturer proprietary application programming interface (API) notification message, e.g., an "iccidTransferRequest" message, sent from the source mobile wireless device 102A to the MNO provisioning server 116. In some embodiments, the message requesting transfer of the eSIM 208 includes an EID value for the eUICC 108 of the source mobile wireless device 102A, an EID value for the eUICC 108 of the target mobile wireless device 102B, and an ICCID value of the eSIM 208 to transfer. At 460, the MNO provisioning server 116 confirms authorization for direct transfer of the eSIM 208 from the source mobile wireless device 102A to the target mobile wireless device 102B. After acceptance of the request to transfer the eSIM 208, the MNO provisioning server 116, at 452, sends a delete eSIM request message to the source mobile wireless device 102A. In some embodiments, the delete eSIM request message is an ES9+ DeleteSIMRequest message. At 454, the source mobile wireless device 102A performs an eSIM deletion procedure to delete the eSIM 208 from the eUICC 108 of the source mobile wireless device 102A. When the eSIM 208 being deleted is the only active eSIM 208 installed on the eUICC 108 of the source mobile wireless device 102A, after deletion of the eSIM 208, the source mobile wireless device 102A can be unable to continue to use cellular connections previously established with credentials of the deleted eSIM 208. In some embodiments, the source mobile wireless device 102A, at 456, establishes an alternate secure communication path with the MNO provisioning server 116 in order to continue communicating securely with the MNO provisioning server 116. In some embodiments, the alternate communication path is via a non-cellular access network 354, e.g., via a Wi-Fi network. In some embodiments, the alternate communication path is via a cellular access network 352 using credentials from a different eSIM 208, a pSIM on a UICC 118, or a limited functionality SIM pre-installed at a time of manufacture in the source mobile wireless device 102A.

At 458, the source mobile wireless device 102A sends a message to the MNO provisioning server 116 confirming deletion of the eSIM 208 from the eUICC 108 of the source mobile wireless device 102A. In some embodiments, the message is an ES9+ DeleteNotification message that includes deleted eSIM information. In some embodiments, the MNO provisioning server 116, at 460, notifies one or more MNO infrastructure servers 304 of the eSIM deletion, e.g., by sending an ES2+ DeleteNotification message. Notification from the MNO provisioning server 116 to the one or more MNO infrastructure servers 304 can includes an update regarding de-associating the ICCID value of the eSIM 208 from the EID value of the eUICC 108 of the source mobile wireless device 102A and re-associating the ICCID value of the eSIM 208 with the EID value of the eUICC 108 of the target mobile wireless device 102B. In some embodiments, at 462, the one or more MNO infrastructure servers 304 reassign the eSIM to the target mobile wireless device 102B. In some embodiments, at 464, the one or more MNO infrastructure servers 304 send a message to the MNO provisioning server 116 confirming reassignment of the eSIM 208 to the target mobile wireless device 102B. At 472, the MNO provisioning server 116 reassigns the eSIM 208 to the target mobile wireless device 102B. At 474, the MNO provisioning server 116 releases the eSIM 208 for downloading to and installation on the eUICC 108 of the target mobile wireless device 102B. At 476, the MNO provisioning server 116 sends a notification to the source mobile wireless device 102A indicating that the eSIM reassignment has completed. In some embodiments, communication between the source mobile wireless device 102A and the MNO provisioning server 116 from the transfer request at 448 to the eSIM reassignment notification 476 is protected using one or more mechanisms, such as via digital certificate verification, cryptographic encryption, or a block chain.

At 478, the source mobile wireless device 102A provides information to the target mobile wireless device 102B for downloading and installation of the eSIM 208 to the eUICC 108 of the target mobile wireless device 102B. In some embodiments the eSIM transfer information is provided via a direct communication path, while in other embodiments, the eSIM transfer information is provided via an indirect communication path, such as through the device manufacturer cloud network service 302. The eSIM transfer information can include an address for the MNO provisioning server 116 from which to download the eSIM 208 or an address of a device manufacturer devices services server 358 from which to obtain the address for the MNO provisioning server 116. In some embodiments, the eSIM transfer information includes a MatchingID value associated with the eSIM transfer to the target mobile wireless device 102B. Using the eSIM transfer information obtained from the source mobile wireless device 102A, the target mobile wireless device 102B, at 480, downloads the eSIM 208 via a secure connection from the MNO provisioning server 116 and, at 482, installs the eSIM 208 on the eUICC 108 of the target mobile wireless device 102B. At 484, in some embodiments, the target mobile wireless device 102B presents to the user 402 an eSIM configuration user interface (UI), e.g., for associating a user-defined label with the eSIM 208 and assignment of voice and/or data configurations for the eSIM 208. At 486, the target mobile wireless device 102B notifies the MNO provisioning server 116 of successful installation of the eSIM 208 on the eUICC 108 of the target mobile wireless device 102B, e.g., by sending an ES2+ handleNotification message. At 488, the target mobile wireless device 102B uses credentials of the eSIM 208 to authenticate with and camp on an MNO cellular access network 352 of the MNO 114. In some embodiments, an MNO infrastructure server 304, at 490, provides an OTA update for the eSIM 208 installed on the eUICC 108 of the target mobile wireless device 102B.

Figure 5A:
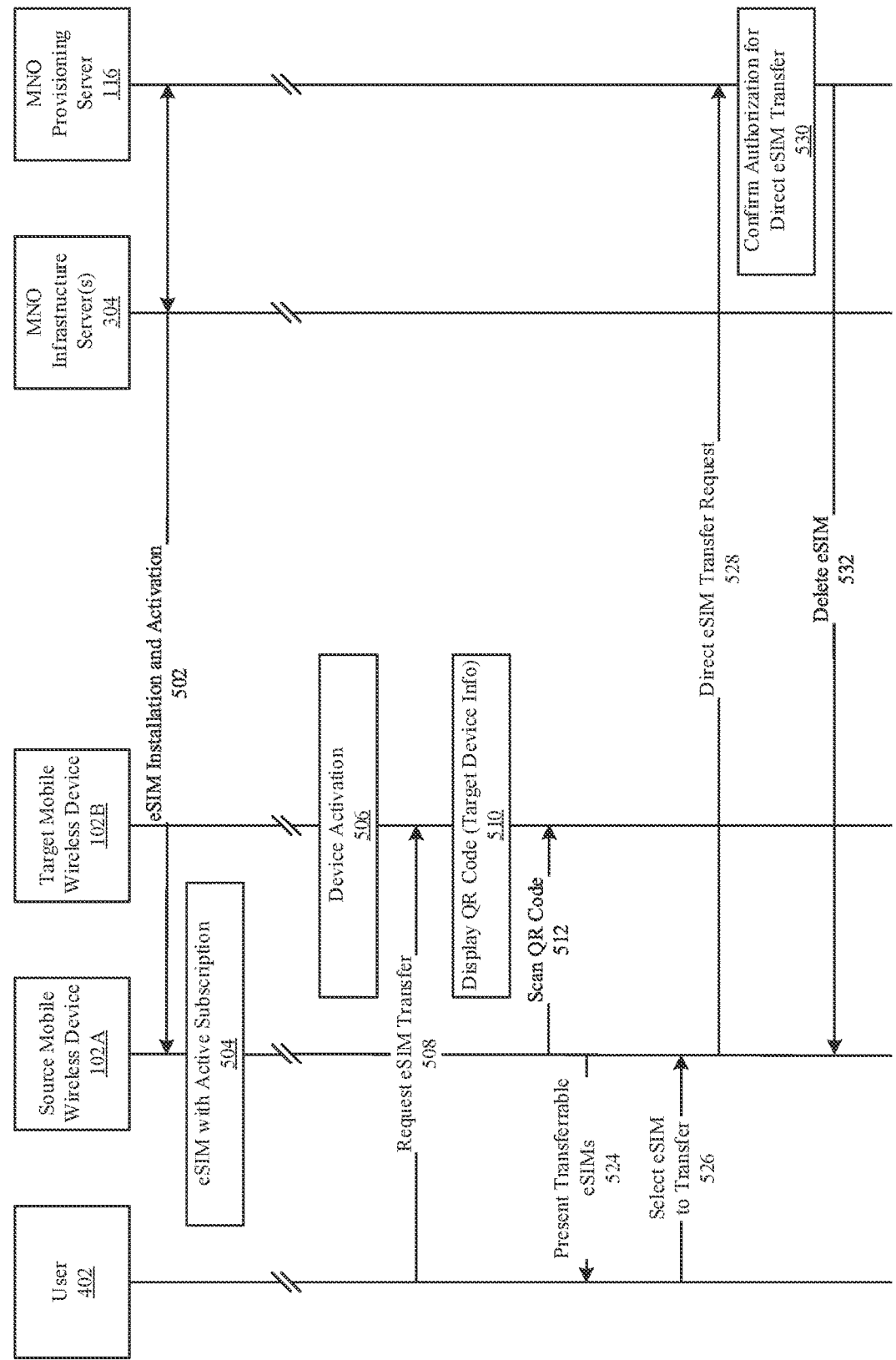
FIGS. 5A, 5B, and 5C illustrate an exemplary eSIM transfer between mobile wireless devices without cloud network service assistance, according to some embodiments.
Figure 5B:
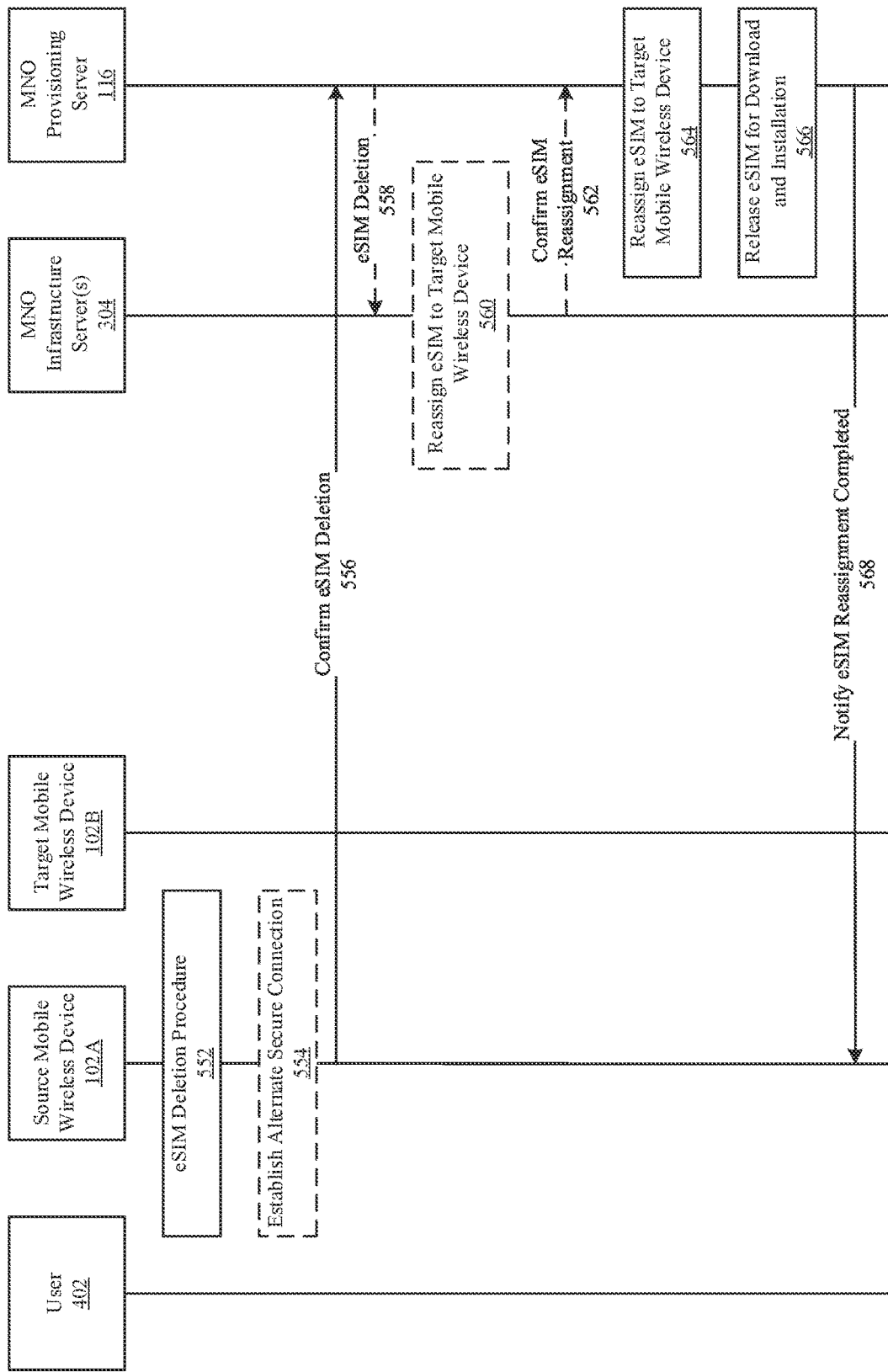
Figure 5C:
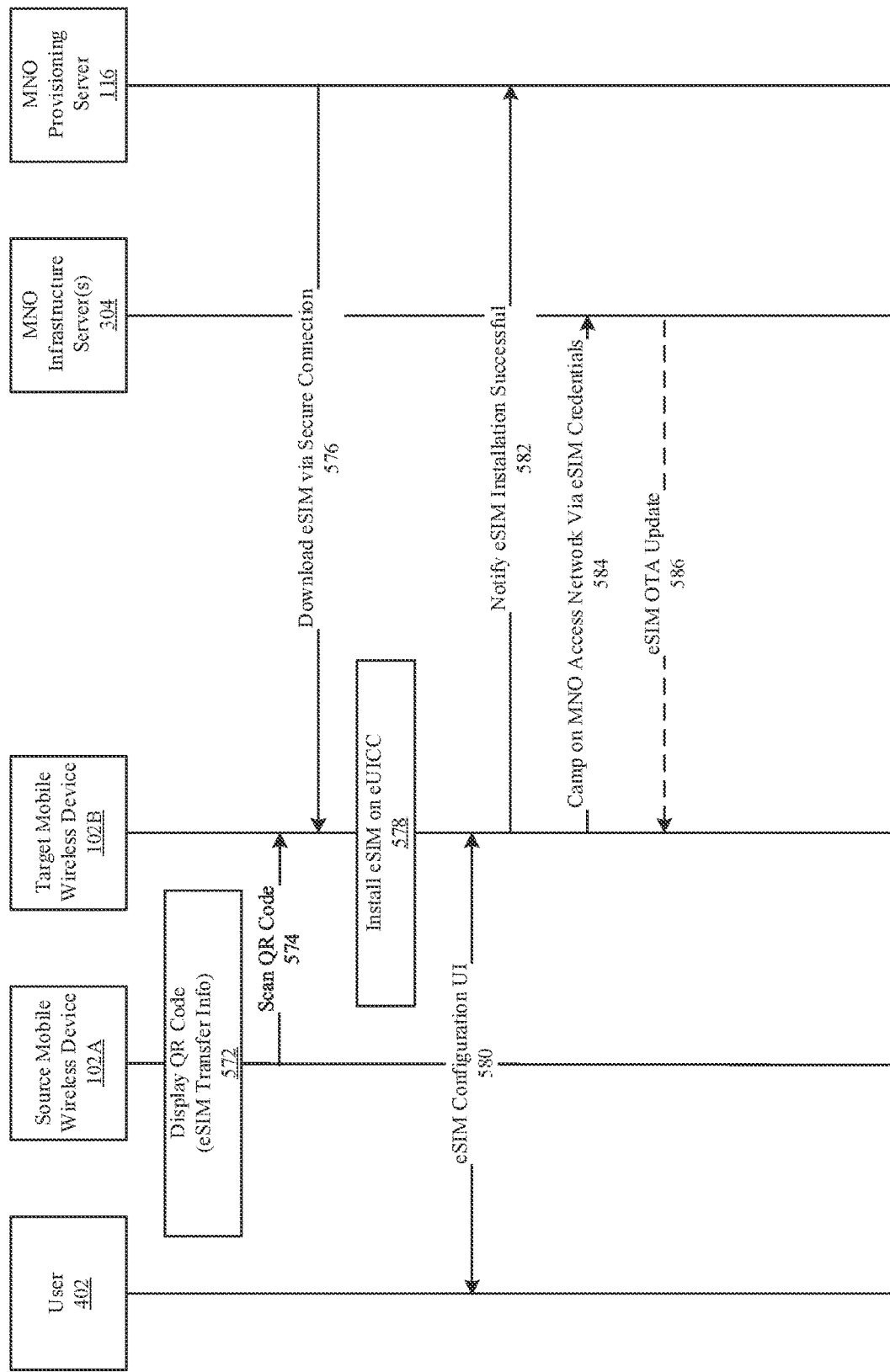

FIGS. 5A, 5B, and 5C illustrate diagrams 500, 540, 570 of an exemplary flow of messages and actions to transfer an eSIM 208 from a source mobile wireless device 102A to a target mobile wireless device 102B without assistance from a device manufacturer cloud network service 302 to facilitate the transfer. At 502, the source mobile wireless device 102A downloads, installs, and activates an eSIM 208 from an MNO provisioning server 116, which can communicate with MNO infrastructure servers 304 to activate and manage wireless service subscription associated with the eSIM 208 for the source mobile wireless device 102A. The eSIM 208 can be associated with a cellular service subscription account and can include credentials to provide access to cellular wireless services offered by an MNO 114. At 504, the source mobile wireless device 102A can have completed installation and activation of the eSIM 208 on an eUICC 108 of the source mobile wireless device 102A.

At a subsequent time 506, a user 402 of the source mobile wireless device 102A can acquire and perform a device activation process for a target mobile wireless device 102B. A user of the source and target mobile wireless devices 102A, 102B can seek to transfer an eSIM 208 from the eUICC 108 of the source mobile wireless device 102A to the target mobile wireless device 102B, e.g., by initiating an eSIM transfer request at 508 via the target mobile wireless device 102B. At 510, the target mobile wireless device 102B can provide target device information for transfer of an eSIM 208 by presenting a dynamic quick response (QR) code via a display of the target mobile wireless device 102B. The source mobile wireless device 102A, at 512, can scan the dynamic QR code, e.g., using a camera of the source mobile wireless device 102A. The dynamic QR code can provide a means to transfer the target device information securely between the target mobile wireless device 102B and the source mobile wireless device 102A. The target device information can include an EID value for the eUICC 108 of the target mobile wireless device 102B to which the eSIM 208 is to be transferred. At 524, the source mobile wireless device 102A can present to the user 402, e.g., via a display of the target mobile wireless device 102B, a list of eSIMs 208 that are transferrable from the source mobile wireless device 102A to the target mobile wireless device 102B, and at 526, the user 402 can select an eSIM 208 to transfer.

At 528, the source mobile wireless device 102A sends a message to the MNO provisioning server 116 to request direct transfer of the eSIM 208 from the source mobile wireless device 102A to the target mobile wireless device 102B. In some embodiments, the message is an ES9+ TransferRequest message. In some embodiments, the message is a device manufacturer proprietary application programming interface (API) notification message, e.g., an "iccidTransferRequest" message, sent from the source mobile wireless device 102A to the MNO provisioning server 116. In some embodiments, the message requesting transfer of the eSIM 208 includes an EID value for the eUICC 108 of the source mobile wireless device 102A, the EID value for the eUICC 108 of the target mobile wireless device 102B, and an ICCID value of the eSIM 208 to transfer. At 530, the MNO provisioning server 116 confirms authorization for direct transfer of the eSIM 208 from the source mobile wireless device 102A to the target mobile wireless device 102B. After acceptance of the request to transfer the eSIM 208, the MNO provisioning server 116, at 532, sends a delete eSIM request message to the source mobile wireless device 102A. In some embodiments, the delete eSIM request message is an ES9+ DeleteSIMRequest message. At 552, the source mobile wireless device 102A performs an eSIM deletion procedure to delete the eSIM 208 from the eUICC 108 of the source mobile wireless device 102A. When the eSIM 208 being deleted is the only active eSIM 208 installed on the eUICC 108 of the source mobile wireless device 102A, after deletion of the eSIM 208, the source mobile wireless device 102A can be unable to continue to use cellular connections previously established with credentials of the deleted eSIM 208. In some embodiments, the source mobile wireless device 102A, at 554, establishes an alternate secure communication path with the MNO provisioning server 116 in order to continue communicating securely with the MNO provisioning server 116. In some embodiments, the alternate communication path is via a non-cellular access network 354, e.g., via a Wi-Fi network. In some embodiments, the alternate communication path is via a cellular access network 352 using credentials from a different eSIM 208, a pSIM on a UICC 118, or a limited functionality SIM pre-installed at a time of manufacture in the source mobile wireless device 102A.

At 556, the source mobile wireless device 102A sends a message to the MNO provisioning server 116 confirming deletion of the eSIM 208 from the eUICC 108 of the source mobile wireless device 102A. In some embodiments, the message is an ES9+ DeleteNotification message that includes deleted eSIM information. In some embodiments, the MNO provisioning server 116, at 558, notifies one or more MNO infrastructure servers 304 of the eSIM deletion, e.g., by sending an ES2+ DeleteNotification message. Notification from the MNO provisioning server 116 to the one or more MNO infrastructure servers 304 can includes an update regarding de-associating the ICCID value of the eSIM 208 from the EID value of the eUICC 108 of the source mobile wireless device 102A and re-associating the ICCID value of the eSIM 208 with the EID value of the eUICC 108 of the target mobile wireless device 102B. In some embodiments, at 560, the one or more MNO infrastructure servers 304 reassign the eSIM to the target mobile wireless device 102B. In some embodiments, at 562, the one or more MNO infrastructure servers 304 send a message to the MNO provisioning server 116 confirming reassignment of the eSIM 208 to the target mobile wireless device 102B. At 564, the MNO provisioning server 116 reassigns the eSIM 208 to the target mobile wireless device 102B. At 566, the MNO provisioning server 116 releases the eSIM 208 for downloading to and installation on the eUICC 108 of the target mobile wireless device 102B. At 568, the MNO provisioning server 116 sends a notification to the source mobile wireless device 102A indicating that the eSIM reassignment has completed. In some embodiments, communication between the source mobile wireless device 102A and the MNO provisioning server 116 from the transfer request at 448 to the eSIM reassignment notification 476 is protected using one or more mechanisms, such as via digital certificate verification, cryptographic encryption, or a block chain.

At 574, the source mobile wireless device 102A provides information to the target mobile wireless device 102B for downloading and installation of the eSIM 208 to the eUICC 108 of the target mobile wireless device 102B by displaying a dynamic QR code, which the target mobile wireless device 102B scans at 574. The eSIM transfer information can include an address for the MNO provisioning server 116 from which to download the eSIM 208 or an address of a device manufacturer devices services server 358 from which to obtain the address for the MNO provisioning server 116. In some embodiments, the eSIM transfer information includes a MatchingID value associated with the eSIM transfer to the target mobile wireless device 102B. Using the eSIM transfer information obtained from the source mobile wireless device 102A, the target mobile wireless device 102B, at 576, downloads the eSIM 208 via a secure connection from the MNO provisioning server 116 and, at 578, installs the eSIM 208 on the eUICC 108 of the target mobile wireless device 102B. At 580, in some embodiments, the target mobile wireless device 102B presents to the user 402 an eSIM configuration user interface (UI), e.g., for associating a user-defined label with the eSIM 208 and assignment of voice and/or data configurations for the eSIM 208. At 582, the target mobile wireless device 102B notifies the MNO provisioning server 116 of successful installation of the eSIM 208 on the eUICC 108 of the target mobile wireless device 102B, e.g., by sending an ES2+ handleNotification message. At 584, the target mobile wireless device 102B uses credentials of the eSIM 208 to authenticate with and camp on an MNO cellular access network 352 of the MNO 114. In some embodiments, an MNO infrastructure server 304, at 586, provides an OTA update for the eSIM 208 installed on the eUICC 108 of the target mobile wireless device 102B.

Figure 6:
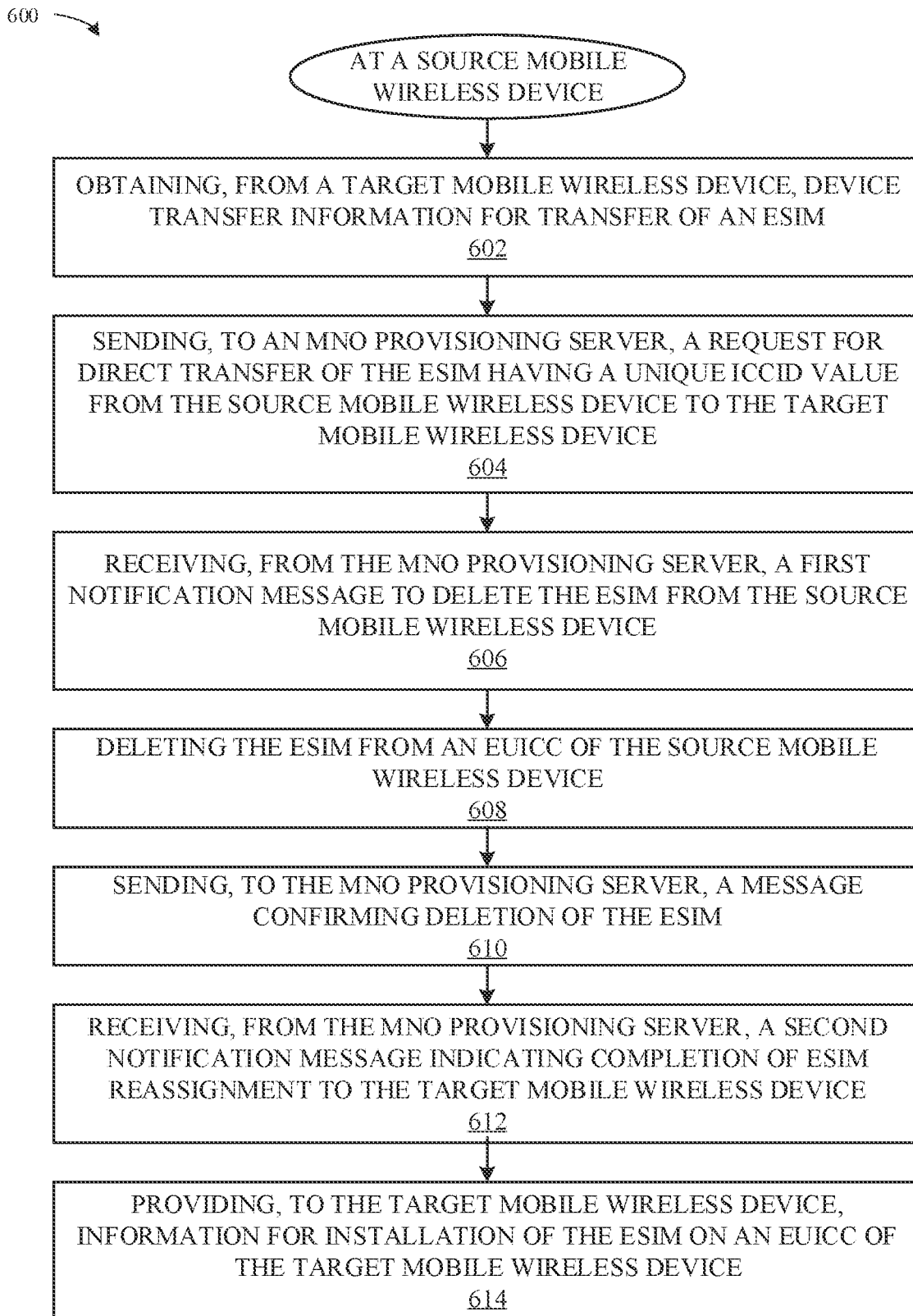
FIG. 6 illustrates a flowchart of an exemplary eSIM transfer for a source mobile wireless device, according to some embodiments.

FIG. 6 illustrates a flowchart 600 of an exemplary method for eSIM 208 transfer from a source mobile wireless device 102A to a target mobile wireless device 102B, where the method is performed by the source mobile wireless device 102A. At 602, the source mobile wireless device obtains, from the target mobile wireless device 102B, device transfer information for transfer of an eSIM 208. In some embodiments, communication of the device transfer information is via a secure, encrypted communication path. In some embodiments, the secure, encrypted communication path includes a direct communication path via a wireless personal area network or a peer-to-peer wireless local area network between the source and target mobile wireless devices 102A, 102B. In some embodiments, the secure, encrypted communication path includes an indirect communication path via a cloud network services server 362 managed by the original equipment manufacturer (OEM) of the source and target mobile wireless devices 102A, 102B. In some embodiments, the source mobile wireless device 102A uploads to the cloud network services server 362 subscription information for one or more eSIMs 208 stored on the eUICC 108 of the source mobile wireless device 102A. In some embodiments, the target mobile wireless device 102B obtains and displays at least a portion of the subscription information for the one or more eSIMs 208 for selection of the eSIM 208 to transfer from the source mobile wireless device 102A to the target mobile wireless device 102B. In some embodiments, the source mobile wireless device 102A obtains the device transfer information by scanning a dynamic quick response (QR) code displayed on the target mobile wireless device 102B. In some embodiments, the device transfer information comprises an eUICC identifier (EID) value for the eUICC 108 of the target mobile wireless device 102B.

At 604, the source mobile wireless device 102A, sends, to an MNO provisioning server 116, a request for direct transfer of the eSIM 208 having a unique ICCID value from the source mobile wireless device 102A to the target mobile wireless device 102B. In some embodiments, the request for direct transfer of the eSIM 208 includes an eUICC identifier (EID) value for the eUICC 108 of the source mobile wireless device 102A, an EID value for the eUICC 108 of the target mobile wireless device 102B, and the unique ICCID value of the eSIM 208. At 606, the source mobile wireless device 102A receives, from the MNO provisioning server 116, a first notification message to delete the eSIM 208 from the source mobile wireless device 102A. At 608, the source mobile wireless device 102A performs an eSIM deletion process to delete the eSIM 208 from the eUICC 108 of the source mobile wireless device 102A. At 610, the source mobile wireless device 102A sends, to the MNO provisioning server 116, a message confirming deletion of the eSIM 208. At 612, the source mobile wireless device 102A receives, from the MNO provisioning server 116, a second notification message indicating completion of reassignment of the eSIM 208 to the target mobile wireless device 102B. At 614, the source mobile wireless device 102A provides, to the target mobile wireless device 102B, information for installation of the eSIM 208 on an eUICC 108 of the target mobile wireless device 102B. In some embodiments, the information for installation of the eSIM 208 includes a fully qualified domain name (FQDN) for the MNO provisioning server 116. In some embodiments, the information for installation of the eSIM 208 further includes a MatchingID specific for downloading the eSIM 208 from the MNO provisioning server 116 to the target mobile wireless device 102B. In some embodiments, the information for installation of the eSIM 208 includes a device manufacturer device services server 358 from which to obtain a fully qualified domain name (FQDN) for the MNO provisioning server 116. In some embodiments, the eSIM 208, after installation on the eUICC 108 of the target mobile wireless device 102B, has an identical ICCID value as the unique ICCID value previously used for the eSIM 208 on the eUICC 108 of the source mobile wireless device 102A. In some embodiments, the source mobile wireless device 102A communicates with the MNO provisioning server 116 via a first wireless communication link before deletion of the eSIM 208 and via a second wireless communication link after deletion of the eSIM 208. In some embodiments, the second wireless communication link is established using a limited functionality SIM installed in the source mobile wireless device 102A at a time of manufacture. In some embodiments, the source mobile wireless device 102A provides the information for installation of the eSIM 208 by displaying a dynamic quick response (QR) code for scanning by the target mobile wireless device 102B.

Figure 7:
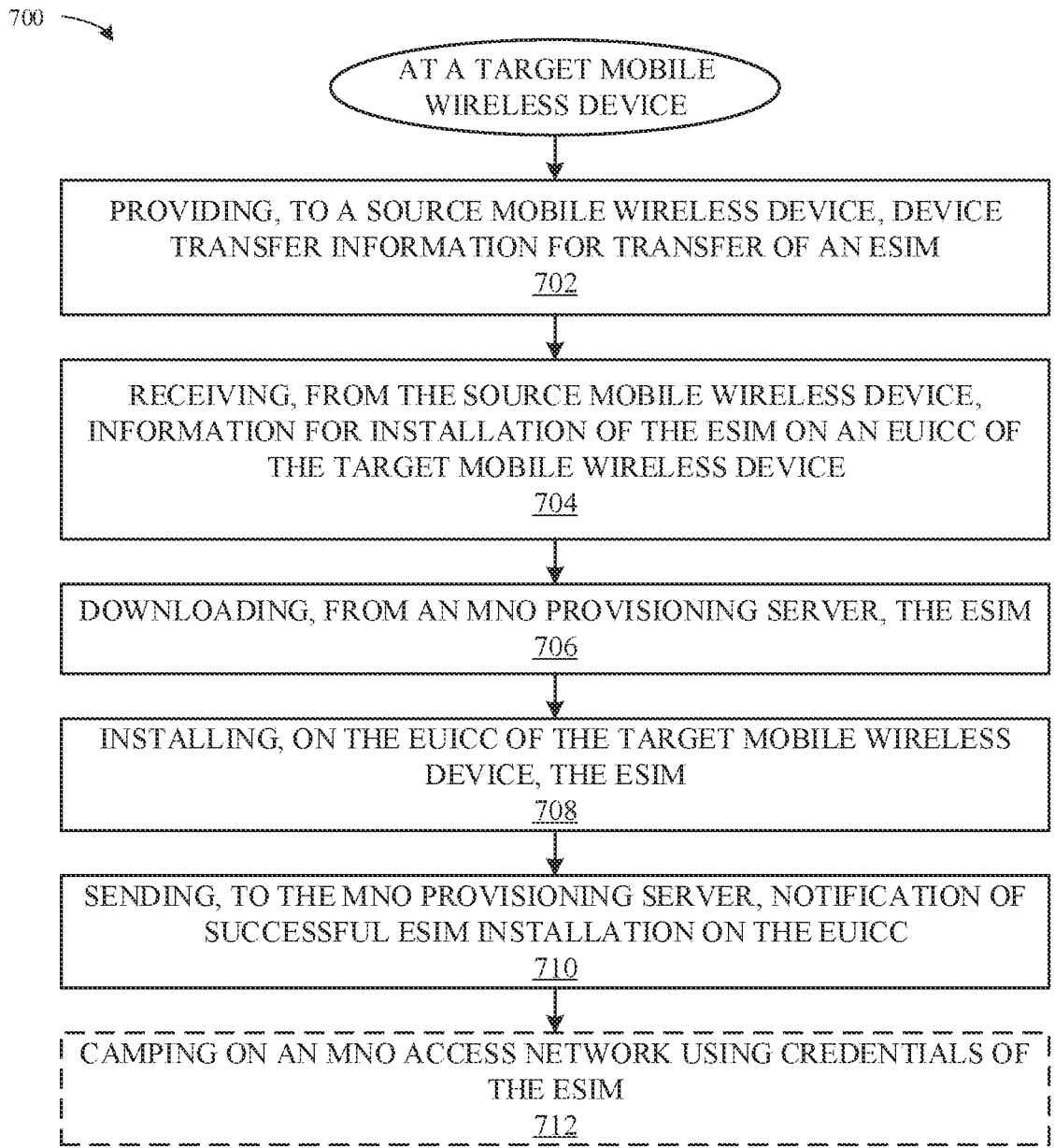
FIG. 7 illustrates a flowchart of an exemplary eSIM transfer for a target mobile wireless device, according to some embodiments.

FIG. 7 illustrates a flowchart 700 of an exemplary method for obtaining an eSIM 208, used to access services of an MNO 114, from a source mobile wireless device 102A by a target mobile wireless device 102B. At 702, the target mobile wireless device 102B provides, to the source mobile wireless device 102A, device transfer information for transfer of the eSIM 208. Communication of the device transfer information can be via a secure, encrypted communication path. In some embodiments, the secure, encrypted communication path includes an indirect communication path via a cloud network services server 362 managed by the original equipment manufacturer (OEM) of the source and target mobile wireless devices 102A, 102B, and each of the source and target mobile wireless devices 102A, 102B share a common user account via the cloud network services server 362. In some embodiments, the secure, encrypted communication path includes a display of a dynamic quick response (QR) code by the target mobile wireless device 102B and a scan of the dynamic QR code by the source mobile wireless device 102A. In some embodiments, the device transfer information includes an eUICC identifier (EID) value of the eUICC 108 of the target mobile wireless device 102B. At 704, the target mobile wireless device 102B receives, from the source mobile wireless device 102A, information for installation of the eSIM 208 on an eUICC 108 of the target mobile wireless device 102B. In some embodiments, the information for installation of the eSIM 208 includes a fully qualified domain name (FQDN) for the MNO provisioning server 116. In some embodiments, the information for installation of the eSIM 208 includes a device manufacturer device services server 358 from which to obtain a fully qualified domain name (FQDN) for the MNO provisioning server 116. At 706, the target mobile wireless device 102B downloads, from an MNO provisioning server 116, the eSIM 208. At 708, the target mobile wireless device 102B installs, on the eUICC 108 of the target mobile wireless device 102B, the eSIM 208. At 710, the target mobile wireless device 102B sends, to the MNO provisioning server 116, notification of successful eSIM installation on the eUICC 108. The eSIM 208, after installation on the eUICC 108 of the target mobile wireless device 102B, has an identical ICCID value as a unique ICCID value previously used for the eSIM 208 when installed on the eUICC 108 of the source mobile wireless device 102A. In some embodiments, at 712, the target mobile wireless device 102B subsequently camps on an MNO cellular access network 352 using credentials of the eSIM 208.

Figure 8:
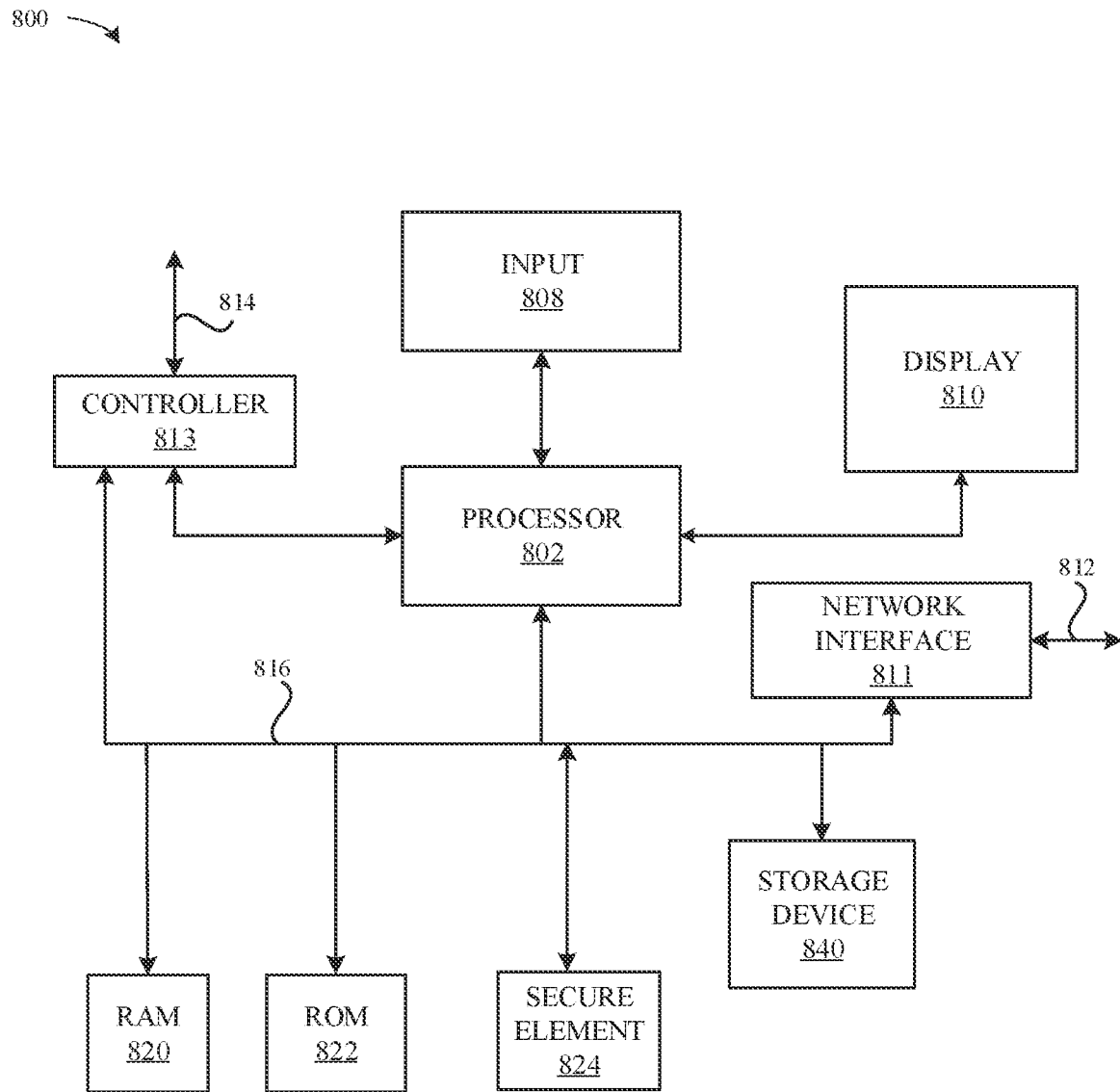
FIG. 8 illustrates a block diagram of exemplary elements of a mobile wireless device, according to some embodiments.

FIG. 8 illustrates a detailed view of a representative computing device 800 that can be used to implement various methods described herein, according to some embodiments. In particular, the detailed view illustrates various components that can be included in the mobile wireless device 102. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 that can be controlled by the processor 802 to display information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that communicatively couples to a data link 812. In the case of a wireless connection, the network/bus interface 811 can include a wireless transceiver.

The computing device 800 also includes a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800. The computing device 800 can further include a secure element (SE) 824, which can represent secure storage for cellular wireless system access by the mobile wireless device 102, such as an eUICC 108 on which to store one or more eSIMs 208 and/or a UICC 118 on which to store a pSIM.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for obtaining an electronic Subscriber Identity Module (eSIM) for access to services of a mobile network operator (MNO) from a source mobile wireless device by a target mobile wireless device, the method comprising:
   by the target mobile wireless device:
   providing, to the source mobile wireless device, device transfer information for transfer of the eSIM;
   receiving, from the source mobile wireless device, information for installation of the eSIM on an embedded universal integrated circuit card (eUICC) of the target mobile wireless device;
   downloading, from an MNO provisioning server, the eSIM;

installing, on the eUICC of the target mobile wireless device, the eSIM; and sending, to the MNO provisioning server, notification of successful eSIM installation on the eUICC, wherein:

communication of the device transfer information is via a secure, encrypted communication path;

the secure, encrypted communication path comprises an indirect communication path via a cloud network services server managed by an original equipment manufacturer (OEM) of the source and target mobile wireless devices;

the eSIM, after installation on the eUICC of the target mobile wireless device, has an identical integrated circuit card identifier (ICCID) value as a unique ICCID value previously used for the eSIM on the eUICC of the source mobile wireless device; and each of the source and target mobile wireless devices share a common user account via the cloud network services server.

2. The method of claim 1, further comprising:

by the target mobile wireless device:

camping on an access network of the MNO using credentials of the eSIM.

3. The method of claim 1, wherein the device transfer information comprises an eUICC identifier (EID) value for the eUICC of the target mobile wireless device.

4. The method of claim 1, wherein the information for installation of the eSIM comprises a fully qualified domain name (FQDN) for the MNO provisioning server.

5. The method of claim 4, wherein the information for installation of the eSIM further comprises a MatchingID specific for downloading the eSIM from the MNO provisioning server to the target mobile wireless device.

6. The method of claim 1, wherein the information for installation of the eSIM comprises a device manufacturer device services server from which to obtain a fully qualified domain name (FQDN) for the MNO provisioning server.

7. The method of claim 1, wherein the target mobile wireless device receives the information for installation of the eSIM from the source mobile wireless device by scanning a dynamic quick response (QR) code displayed by the source mobile wireless device.

8. A target mobile wireless device comprising:

wireless circuitry comprising one or more antennas; and one or more processors communicatively coupled to the wireless circuitry and to a memory storing instructions that, when executed by the one or more processors, cause the target mobile wireless device to obtain from a source mobile wireless device an electronic Subscriber Identity Module (eSIM) for access to services of a mobile network operator (MNO) by at least:

providing, to the source mobile wireless device, device transfer information for transfer of the eSIM;

receiving, from the source mobile wireless device, information for installation of the eSIM on an embedded universal integrated circuit card (eUICC) of the target mobile wireless device;

downloading, from an MNO provisioning server, the eSIM;

installing, on the eUICC of the target mobile wireless device, the eSIM; and sending, to the MNO provisioning server, notification of successful eSIM installation on the eUICC, wherein:

communication of the device transfer information is via a secure, encrypted communication path;

the secure, encrypted communication path comprises an indirect communication path via a cloud network services server managed by an original equipment manufacturer (OEM) of the source and target mobile wireless devices;

the eSIM, after installation on the eUICC of the target mobile wireless device, has an identical integrated circuit card identifier (ICCID) value as a unique ICCID value previously used for the eSIM on the eUICC of the source mobile wireless device; and each of the source and target mobile wireless devices share a common user account via the cloud network services server.

9. The target mobile wireless device of claim 8, wherein the device transfer information comprises an eUICC identifier (EID) value for the eUICC of the target mobile wireless device.

10. The target mobile wireless device of claim 8, wherein the information for installation of the eSIM comprises a fully qualified domain name (FQDN) for the MNO provisioning server.

11. The target mobile wireless device of claim 10, wherein the information for installation of the eSIM further comprises a MatchingID specific for downloading the eSIM from the MNO provisioning server to the target mobile wireless device.

12. The target mobile wireless device of claim 8, wherein the information for installation of the eSIM comprises a device manufacturer device services server from which to obtain a fully qualified domain name (FQDN) for the MNO provisioning server.

13. The target mobile wireless device of claim 8, wherein the target mobile wireless device receives the information for installation of the eSIM from the source mobile wireless device by scanning a dynamic quick response (QR) code displayed by the source mobile wireless device.

14. A non-transitory computer-readable medium storing instructions for obtaining an electronic Subscriber Identity Module (eSIM) for access to services of a mobile network operator (MNO) from a source mobile wireless device by a target mobile wireless device, the instructions comprising:

instructions for providing, to the source mobile wireless device, device transfer information for transfer of the eSIM;

instructions for receiving, from the source mobile wireless device, information for installation of the eSIM on an embedded universal integrated circuit card (eUICC) of the target mobile wireless device;

instructions for downloading, from an MNO provisioning server, the eSIM;

instructions for installing, on the eUICC of the target mobile wireless device, the eSIM; and instructions for sending, to the MNO provisioning server, notification of successful eSIM installation on the eUICC, wherein:

communication of the device transfer information is via a secure, encrypted communication path;

the secure, encrypted communication path comprises an indirect communication path via a cloud network services server managed by an original equipment manufacturer (OEM) of the source and target mobile wireless devices;

the eSIM, after installation on the eUICC of the target mobile wireless device, has an identical integrated circuit card identifier (ICCID) value as a unique ICCID value previously used for the eSIM on the eUICC of the source mobile wireless device; and each of the source and target mobile wireless devices share a common user account via the cloud network services server.

15. The non-transitory computer-readable medium of claim 14, further comprising:

instructions for camping on an access network of the MNO using credentials of the eSIM.

16. The non-transitory computer-readable medium of claim 14, wherein the device transfer information comprises an eUICC identifier (EID) value for the eUICC of the target mobile wireless device.

17. The non-transitory computer-readable medium of claim 14, wherein the information for installation of the eSIM comprises a fully qualified domain name (FQDN) for the MNO provisioning server.

18. The non-transitory computer-readable medium of claim 17, wherein the information for installation of the eSIM further comprises a MatchingID specific for downloading the eSIM from the MNO provisioning server to the target mobile wireless device.

19. The non-transitory computer-readable medium of claim 14, wherein the information for installation of the eSIM comprises a device manufacturer device services server from which to obtain a fully qualified domain name (FQDN) for the MNO provisioning server.

20. The non-transitory computer-readable medium of claim 14, wherein the instructions for receiving the information for installation of the eSIM comprises:

instructions for scanning a dynamic quick response (QR) code displayed by the source mobile wireless device.

* * * * *